J. J. ROSS.
COMBINATION OVEN.
APPLICATION FILED MAY 22, 1909.
980,680.
Patented Jan. 3, 1911.
2 SHEETS—SHEET 1.
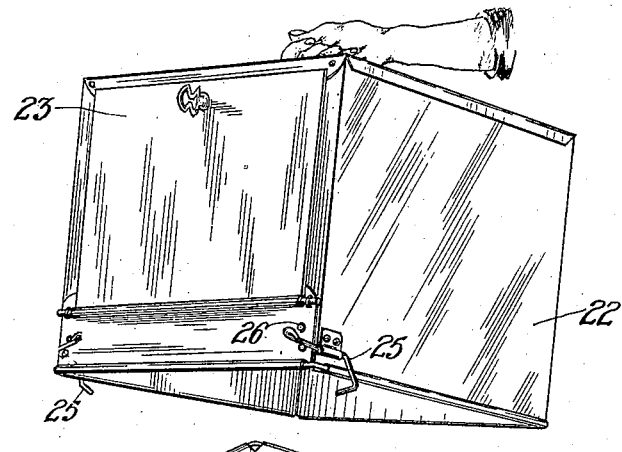
Fig. 1.
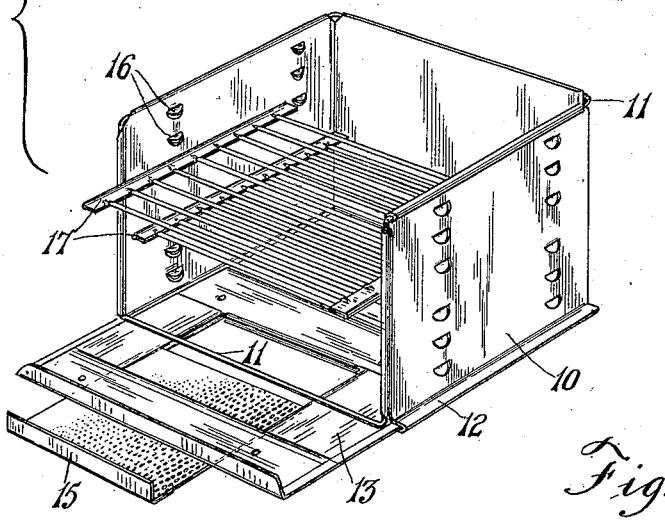
Fig. 6.
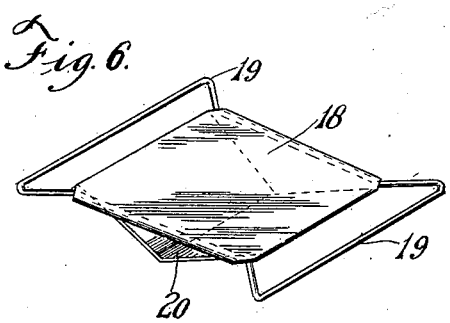
Fig. 7.
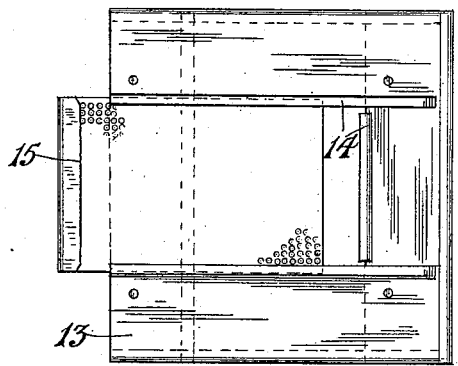
Witnesses.
A. Y. Andrews.
Anna F. Schmidtbauer.
Inventor.
James J. Ross,
By Benedict, Morsell & Caldwell,
Attorneys.
THE NORRIS PETERS CO., WASHINGTON, D. C.

J. J. ROSS.
COMBINATION OVEN.
APPLICATION FILED MAY 22, 1909.

980,680.

Patented Jan. 3, 1911.
2 SHEETS—SHEET 2.

Witnesses.
A. Y. Andrews.
Anna F. Schmidtbauer

Inventor.
James J. Ross
By Benedict, Morsell & Caldwell
Attorneys.

UNITED STATES PATENT OFFICE.

JAMES J. ROSS, OF MILWAUKEE, WISCONSIN.

COMBINATION-OVEN.

980,680.  Specification of Letters Patent.  Patented Jan. 3, 1911.

Application filed May 22, 1909. Serial No. 497,623.

*To all whom it may concern:*

Be it known that I, JAMES J. ROSS, residing in Milwaukee, in the county of Milwaukee and State of Wisconsin, have invented new and useful Improvements in Combination-Ovens, of which the following is a description, reference being had to the accompanying drawings, which are a part of this specification.

This invention has for its object to provide a portable oven for gas ranges and the like which will be provided with removable and adjustable parts permitting it to serve various purposes such as for baking, broiling, toasting and for conveying heated food from place to place.

With the above and other objects in view the invention consists in the combination oven herein claimed, its parts and combinations of parts and all equivalents.

Referring to the accompanying drawings in which like characters of reference indicate the same parts in the different views—

Figure 2:
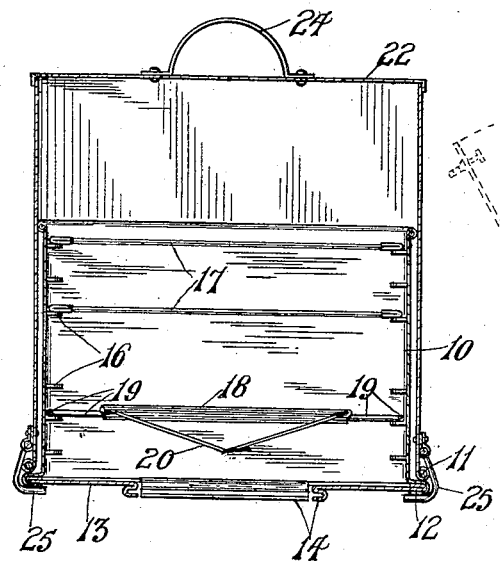
Figure 3:
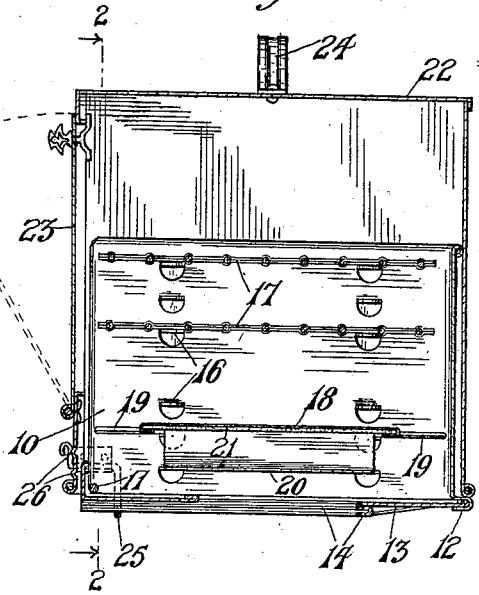
Figure 4:
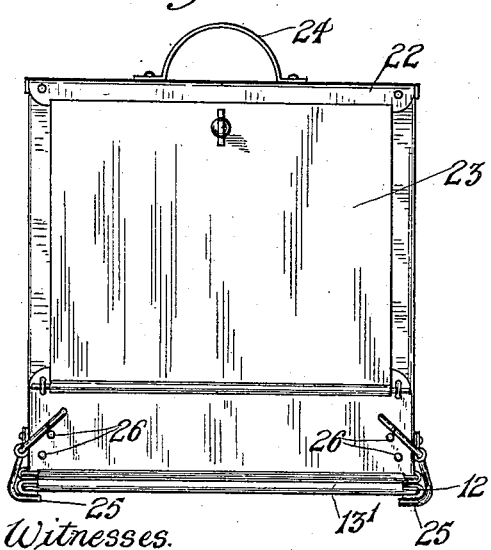
Figure 5:
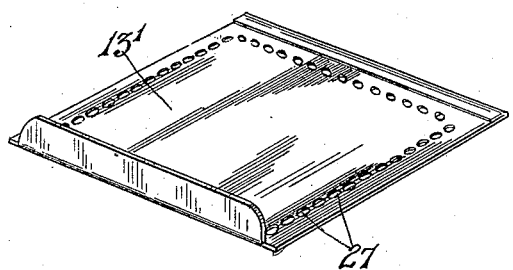

Figure 1 is a perspective view of the combination oven of this invention with the hood withdrawn from the base and the various slides in partially withdrawn positions to suggest their removability; Fig. 2 is a transverse sectional view of the oven in condition for baking; Fig. 3 is a similar sectional view thereof on a plane at right angles to the sectional plane of Fig. 2; Fig. 4 is a front elevation of the oven; Fig. 5 is a perspective view of the plain bottom for use when the oven is employed for conveying food from place to place or for heating irons or the like; Fig. 6 is a perspective view of the deflector for use when the oven is employed for baking; and, Fig. 7 is a bottom view of the removable bottom ordinarily used with the oven showing the perforated plate thereof partially withdrawn.

In these drawings 10 indicates a base or body portion of the oven, preferably composed of sheet metal formed upon an angular wire frame 11 which has the front and top edges of the side pieces of the base and the top edge of the back piece turned thereon so that the base consisting of said back piece and the two side pieces is braced and made rigid by the heavy wire frame and the said side pieces have their front edges held in fixed position with relation to each other by said wire frame 11 connecting them near their lower ends as shown in Fig. 1. The lower edges of the side pieces and the back piece of the base or body portion 10 are bent outwardly and then upon themselves to form guide grooves for a bottom plate 13 which is slipped in place therein from the front as shown in Fig. 1, said bottom plate passing just beneath the portion of the wire frame 11 which connects the side pieces of the base 10. The bottom plate 13 in turn is provided with a central opening with guide grooves 14 formed at its edges to receive a perforated sheet metal plate 15 which slips in place therein from the front.

The side pieces of the base 10 have inwardly extending supporting lugs 16 struck up therefrom which form ledges at different elevations for supporting wire frames or racks 17 at different distances from the bottom plate and also for supporting a deflector 18. The deflector comprises a sheet metal top plate somewhat larger than the opening in the bottom plate 13 but smaller than the area of the base so as to leave a space entirely surrounding it, said plate having its edges turned over a wire frame 19 which is of a shape to fit upon the lugs 16 and properly space the plate above the opening in the bottom plate, and a V-shaped deflecting plate 20 beneath the supporting plate to deflect the hot air and gases entering through the opening in the bottom plate toward each side of the oven, a sheet of asbestos or other heat insulating material 21 being preferably mounted beneath the supporting plate as a lining therefor, as shown in Fig. 3.

A hood 22 of a shape and size to neatly fit over the base or body portion 10 is provided and the main portion of the front of said hood consists of a downwardly swinging door 23 which may be locked closed in the usual manner and through which access may be had to the interior when the hood is in place upon the base. A handle 24 is formed on the top of the hood for convenience in handling it and pivoted catches 25 are provided at the lower edge of the hood to engage beneath the base 10 as shown in Fig. 2 and lock the hood and base together. The pivoted catches as here shown are in the form of wire hooks pivotally mounted in cleats on the sides of the hood and having spring handles bent to bear against the front of the hood with pressure where they ride over studs or projections 26 in the front of the hood, preferably formed by indentations on the inner side thereof, as shown in Fig. 3, and in this manner the catches are locked in their open or closed position.

A sheet metal supplemental bottom plate 13' may be substituted for or associated with the bottom plate 13 by sliding it in the guides 12 and it is without the central opening of the bottom plate 13, having instead a series of perforations 27 around its edge. In practice the bottom plate 13 is usually employed and when it has its perforated plate 15 removed and the deflector 18 is in place above the opening as shown in Figs. 2 and 3 with the hood placed over the base the device constitutes an oven for baking, the baking pans being placed directly upon the upper plate of the deflector or upon the racks 17 in position thereabove. The baking pans may be inserted or removed at will by opening the door 23. The hot air from the flame below will enter the oven through the opening and will be thrown to all sides of the oven by the deflector so as to uniformly heat the entire interior of the oven, the air space formed between the walls of the base and the hood serving to assist in retaining the heat within the oven. With the deflector removed and the perforated plate 15 in place, as shown in Fig. 1, the oven is adapted to serve for toasting, the perforated plate preventing the scorching of the material being toasted and the distance of the material from the flame being regulated by raising or lowering the supporting racks 17. The toasting may be performed with the hood in place, when access may be had to the interior through the door, or the hood may be removed and the toasting performed on the base portion alone. By leaving the deflector out and removing the perforated plate 15 the oven may be used for broiling, the meat or other material to be broiled being placed upon the racks 17 nearer to or farther from the flame which has free access thereto through the opening in the bottom plate 13. By substituting the supplemental bottom plate 13' for the bottom plate 13 the oven may be used for heating sad irons or the like, which may be inserted and removed through the door opening, the deflector and racks being removed at such times. In this condition of the oven it is also adapted for carrying food from place to place, the openings in the bottom permitting of ventilation thereof without a material loss of the heat.

What I claim as new and desire to secure by Letters Patent is—

1. A combination oven comprising a base having side and back pieces, a bottom plate provided with a central opening, a perforated plate removably fitting in the opening of the bottom plate, supporting racks adjustably supported within the base, and a hood for inclosing the base.

2. A combination oven comprising a base having side and back pieces, a bottom plate provided with a central opening, a perforated plate removably fitting in the opening of the bottom plate, supporting racks adjustably supported within the base, a hood for inclosing the base provided with a hinged door, and pivoted catches on the hood for engaging beneath the base to lock them together.

3. A combination oven comprising a base having side and back pieces, a bottom plate provided with a central opening, a perforated plate removably fitting in the opening of the bottom plate, supporting racks adjustably supported within the base, a hood for inclosing the base provided with a hinged door, and pivoted catches on the hood for engaging beneath the base to lock them together, the said pivoted catches having spring handles to engage projections provided therefor on the hood to hold the catches in their closed or their open position.

4. A combination oven comprising a base having upstanding walls formed by side and back pieces, a bottom plate provided with a central opening, a deflector adjustably mounted on the side pieces of the base with a space between it and the walls of the base, supporting racks adjustably supported within the base, and a hood for inclosing the base.

5. A combination oven comprising a base having upstanding walls formed by side and back pieces, the side pieces having ledges thereon, a bottom plate provided with a central opening, a deflector adjustably mounted on the side pieces of the base with a space between it and the walls of the base, said deflector comprising a plate mounted on a wire frame to engage the ledges of the side pieces and space the plate from the walls of the base and having an asbestos or other heat insulating lining and a V-shaped bottom plate, supporting racks adjustably supported on the ledges of the base, and a hood for inclosing the base.

6. A combination oven comprising a base having sheet metal side and back pieces with guide grooves in their lower edges and a wire frame around which the top and front edges of the side and back pieces are turned, said frame extending across the front of the base at its lower edge to brace the side pieces apart, a removable bottom plate slidably fitting in the guide grooves of the base and having a central opening, a perforated plate slidably fitting in the opening of the bottom plate, the side pieces of the base being provided with a series of ledges formed by striking up lugs therein, a deflector adjustably mounted on said ledges, racks also adjustably mounted on said ledges, and a hood fitting around the base and having means for connection therewith and a handle for moving it from place to place and provided with a swinging door at the front thereof.

7. In combination, a base having sheet metal side and back pieces with guide grooves in their lower edges and a wire frame around which the top and front edges of the side and back pieces are turned, said frame extending across the front of the base at its lower edge to brace the side pieces apart, a removable bottom plate slidably fitting in the guide groves of the base and having a central opening, a perforated plate slidably fitting in the opening of the bottom plate, the side pieces of the base being provided with a series of ledges, and a rack adjustably mounted on said ledges.

In testimony whereof, I affix my signature, in presence of two witnesses.

JAMES J. ROSS.

Witnesses:
R. S. C. CALDWELL,
ANNA F. SCHMIDTBAUER.